(12) United States Patent
Chang et al.

(10) Patent No.: US 11,431,871 B2
(45) Date of Patent: Aug. 30, 2022

(54) SCANNING MODULE AND SCANNER INCLUDING THE SCANNING MODULE WITH A SCANNING CHANNEL OBLIQUELY SLANTED FORWARD BETWEEN A DOWNWARD SLANTED SCANNING GLASS AND LOWER SURFACE OF THE SCANNER

(71) Applicant: Foxlink Image Technology Co., Ltd., New Taipei (TW)

(72) Inventors: Cheng Hsiung Chang, New Taipei (TW); Jing Hua Fang, New Taipei (TW); Pei Chun Lu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 17/179,318

(22) Filed: Feb. 18, 2021

(65) Prior Publication Data

US 2021/0360119 A1    Nov. 18, 2021

(30) Foreign Application Priority Data

May 18, 2020   (TW) ................................ 109206080

(51) Int. Cl.
*H04N 1/00* (2006.01)
*H04N 1/12* (2006.01)
*H04N 1/04* (2006.01)

(52) U.S. Cl.
CPC ..... *H04N 1/00909* (2013.01); *H04N 1/00559* (2013.01); *H04N 1/1235* (2013.01)

(58) Field of Classification Search
CPC .......... H04N 1/00559; H04N 1/00909; H04N 1/1235
USPC .................................................... 358/497, 498
See application file for complete search history.

(56) References Cited

U.S. PATENT DOCUMENTS

2015/0249762 A1* 9/2015 Ishida ................ H04N 1/00737
358/497
2015/0281499 A1* 10/2015 Hamaguchi ........ H04N 1/00909
358/498

FOREIGN PATENT DOCUMENTS

JP       2001274950 A  * 10/2001
JP       2015195475 A  * 11/2015   ......... H04N 1/00572

* cited by examiner

*Primary Examiner* — Chad Dickerson
(74) *Attorney, Agent, or Firm* — Lin & Associates Intellectual Property, Inc.

(57) ABSTRACT

A scanner includes a scanning module. The scanning module has a scan channel and a scanning glass. A lower surface of the scanner is defined as a bottom wall of the scan channel. The scanning glass is positioned above the scan channel. A bottom surface of the scanning glass is defined as a top wall of the scan channel. The lower surface of the scanner has an upstream turn connected between an upstream section and a middle section of the lower surface of the scanner, the middle section of the lower surface of the scanner is parallel with the bottom surface of the scanning glass.

3 Claims, 5 Drawing Sheets

SCANNING MODULE AND SCANNER INCLUDING THE SCANNING MODULE WITH A SCANNING CHANNEL OBLIQUELY SLANTED FORWARD BETWEEN A DOWNWARD SLANTED SCANNING GLASS AND LOWER SURFACE OF THE SCANNER

CROSS-REFERENCE TO RELATED APPLICATION

The present application is based on, and claims priority from, Taiwan Patent Application No. 109206080, filed May 18, 2020, the disclosure of which is hereby incorporated by reference herein in its entirety.

BACKGROUND OF THE INVENTION

1. Field of the Invention

The present invention generally relates to a scanning module, and more particularly to a scanning module which is able to clean the scanning module automatically and maintain scanning quality at the time of a document being scanned, and a scanner including the scanning module.

2. The Related Art

Referring to FIG. 5, a conventional scanner 200' includes a feed-in channel 10' communicated with an external space, a scan channel 20' connected with a rear of the feed-in channel 10' and feeding a document horizontally, and a feed-out channel 30' connected with a rear of the scan channel 20'. The feed-in channel 10', the scan channel 20', the feed-out channel 30' and the scanning glass 50' together define a scanning module. The scan channel 20' is a horizontal channel. The conventional scanner 200' further includes a scanning glass 50' arranged at a bottom of the scan channel 20', and a brush 70' arranged above the scan channel 20'. When the document is scanned by the conventional scanner 200', dust will be accumulated at the scanning glass 50' of the scan channel 20', and will be attracted by the scanning glass 50' of the scan channel 20' by an electrostatic force.

When the document is fed through the scan channel 20', the document is fed towards the feed-out channel 30' along the scanning glass 50', and because the scan channel 20' is the horizontal channel, the document will proceed with a horizontal path movement in a process of the document passing through the scan channel 20' horizontally. It is more difficult for the document to contact with the scanning glass 50' tightly on account of the scan channel 20' being the horizontal channel, consequently, the document can just carry a little dust away from the scan channel 20', most of the dust will be remained and stacked at the scanning glass 50' by an effect of the electrostatic force, in order to clean all the dust away at the time of stopping scanning the document, the brush 70' assembled above the scan channel 20' is driven to rotate to sweep the dust stacked at the scanning glass 50' from the scan channel 20'.

However, the above-mentioned way of cleaning the dust with the brush 70' will increase a volume of internal parts of the conventional scanner 200', and the conventional scanner 200' need be equipped with an additional motor to drive the brush 70' to rotate, in that case, the conventional scanner 200' will consume an extra electric power, increase a volume of an overall design of the conventional scanner 200' and produce more noises. As a result, the conventional scanner 200' is unable to clean the scanning module automatically and to maintain scanning quality.

Therefore, it is necessary to provide an innovative scanning module, and an innovative scanner including the innovative scanning module, the innovative scanning module is able to consume less electric power to clean the dust, reduce the noises, and decrease internal parts needed by the innovative scanning module so as to save a volume of the innovative scanning module, and the innovative scanning module is able to clean the innovative scanning module automatically and maintain scanning quality at the time of a document being scanned.

SUMMARY OF THE INVENTION

An object of the present invention is to provide a scanning module mounted in a scanner. The scanning module is able to maintain scanning quality at the time of a document being scanned. The scanning module includes a feed-in channel, a scan channel arranged at a downstream end of the feed-in channel and connected with the feed-in channel, a fixing frame and a scanning glass. The fixing frame is disposed above the scan channel. The fixing frame cooperates with the scan channel. A bottom of the fixing frame has an accommodating space. A mouth of the accommodating space is disposed towards an oblique direction. The oblique direction is disposed towards the feed-in channel. The scan channel is an oblique channel slantwise extending downward and towards a downstream direction. The scanning glass is mounted in the mouth of the accommodating space and covers the accommodating space. The scanning glass is disposed to a top of the scan channel. The scan channel and the scanning glass are disposed in an inclined position.

Another object of the present invention is to provide a scanning module mounted in a scanner. The scanning module includes a feed-in channel, a fixing frame, a scanning glass and a scan channel. A bottom of the fixing frame has an accommodating space. A mouth of the accommodating space is disposed towards an oblique direction. The oblique direction is disposed towards the feed-in channel. The scanning glass is mounted in the mouth of the accommodating space and covers the accommodating space. An inclined bottom surface of the scanning glass is located above and spaced from an inclined lower surface of the scanner. The scan channel is arranged at a downstream end of the feed-in channel and connected with the feed-in channel. The scan channel is formed between the inclined bottom surface of the scanning glass and the inclined lower surface of the scanner. The scan channel is an oblique channel slantwise extending downward and towards a downstream direction.

Another object of the present invention is to provide a scanner. The scanner includes a scanning module. The scanning module has a scan channel and a scanning glass. A lower surface of the scanner is defined as a bottom wall of the scan channel. The scanning glass is positioned above the scan channel. A bottom surface of the scanning glass is defined as a top wall of the scan channel. The lower surface of the scanner has an upstream turn connected between an upstream section and a middle section of the lower surface of the scanner, the middle section of the lower surface of the scanner is parallel with the bottom surface of the scanning glass, a first gap formed between the upstream section of the lower surface of the scanner and the bottom surface of the scanning glass is larger than a second gap formed between the middle section of the lower surface of the scanner and the bottom surface of the scanning glass.

As described above, when the document passes through the scan channel, the document contacts with and is tightly attached to the inclined bottom surface of the scanning glass, dust is simultaneously wiped from the scanning glass by the document and by virtue of the scan channel and the scanning glass being disposed in an inclined position, in this way, superfluous wiping modules are saved, and the dust is prevented from being stacked in the scan channel. As a result, the scanner saves a volume of the scanning module, and the scanning module is able to clean the scanning module automatically and maintain scanning quality at the time of the document being scanned by the scanning module.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
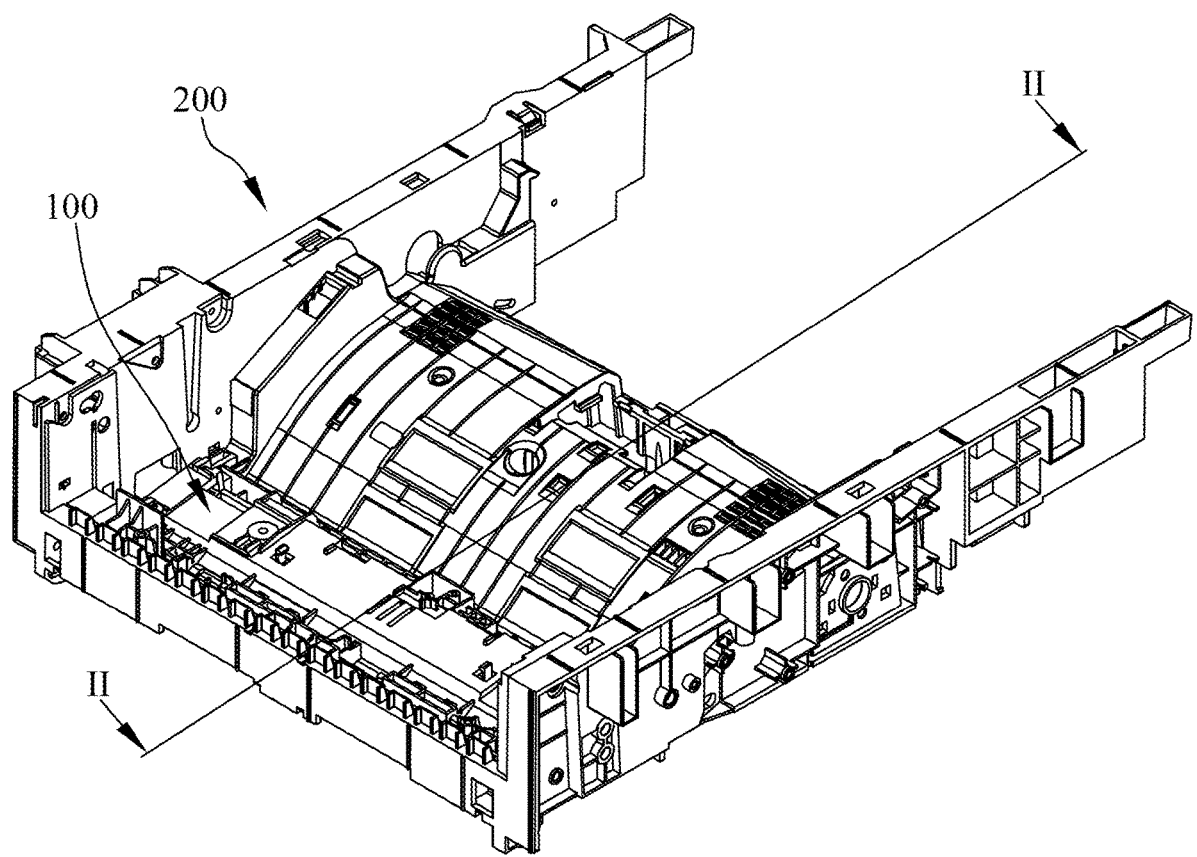
FIG. 1 is a perspective view of a scanning module, wherein the scanning module is assembled in a scanner.

Referring to FIG. 1 to FIG. 4, a scanning module 100 and a scanner 200 in accordance with the present invention are shown. The scanning module 100 according to the present invention is adapted for being applied in the scanner 200 to scan a document 300. The scanning module 100 is mounted in the scanner 200. The scanning module 100 is used for scanning the document 300. The scanning module 100 has a feed-in channel 10 disposed to an inside of the scanning module 100 and connected to an external space. A direction of the document 300 being fed in is defined as an upstream direction, and a direction of the document 300 being fed out is defined as a downstream direction.

The scanning module 100 has a scan channel 20 arranged at a downstream end of the feed-in channel 10 and connected with the feed-in channel 10, and a feed-out channel 30 arranged at a downstream of the scan channel 20 and connected with the scan channel 20. The feed-in channel 10 is positioned at an upstream portion of the scanner 200 and is connected to the scan channel 20, and the feed-out channel 30 is positioned at a downstream portion of the scanner 200 and is connected to the scan channel 20. When the document 300 is scanned, the document 300 passes through the scan channel 20. The scanning module 100 is equipped with a scanning glass 50.

The scanning module 100 includes a fixing frame 40 extending transversely. A bottom of the fixing frame 40 has an accommodating space 41. A mouth of the accommodating space 41 is disposed towards an oblique direction seen from a lateral side of the scanning module 100. The oblique direction is disposed towards the feed-in channel 10. The scanning glass 50 is mounted in the mouth of the accommodating space 41 and covers the accommodating space 41. The accommodating space 41 is equipped with a plurality of light emitters 60 and a plurality of photoelectricity sensors 70. The fixing frame 40 is disposed above the scan channel 20. The fixing frame 40 cooperates with the scan channel 20. So, the scanner 200 includes the scanning module 100 which includes the feed-in channel 10, the scan channel 20, the feed-out channel 30, the fixing frame 40, the scanning glass 50, the plurality of light emitters 60 and the plurality of photoelectricity sensors 70.

The plurality of the light emitters 60 and the plurality of the photoelectricity sensors 70 are arranged perpendicular to the scanning glass 50 to maintain a depth-of-field setting of the scanner 200. Because the mouth of the accommodating space 41 is obliquely disposed towards the scanning glass 50 and is deviated to the feed-in channel 10, the scanning glass 50 is in an inclined position, and the plurality of the light emitters 60 and the plurality of the photoelectricity sensors 70 are without being parallel to a bottom surface of the scanner 200 and flat ground. The plurality of the light emitters 60 are used to emit light sources penetrating through the scanning glass 50 to pass through the scan channel 20 so as to illuminate the document 300, and then the document 300 reflects the light sources and the reflected light sources penetrate through the scanning glass 50 to enter the plurality of the photoelectricity sensors 70, so that the scanning module 100 proceeds with an action of scanning the document 300.

Figure 2:
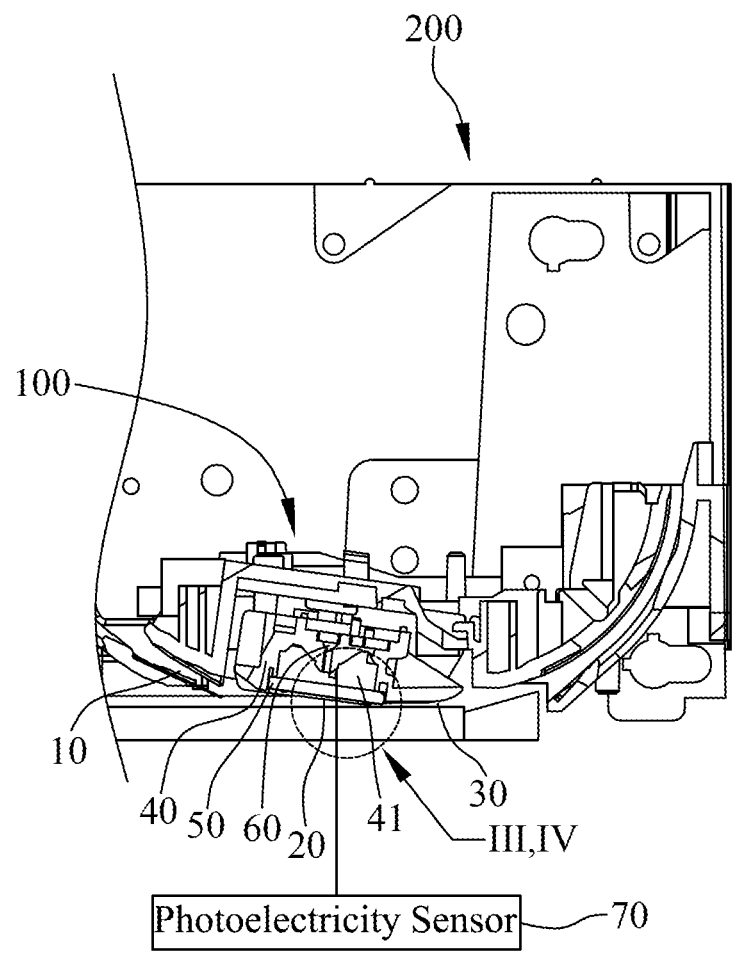
FIG. 2 shows a sectional view of scanner including the scanning module along a line II-II of FIG. 1.
Figure 3:
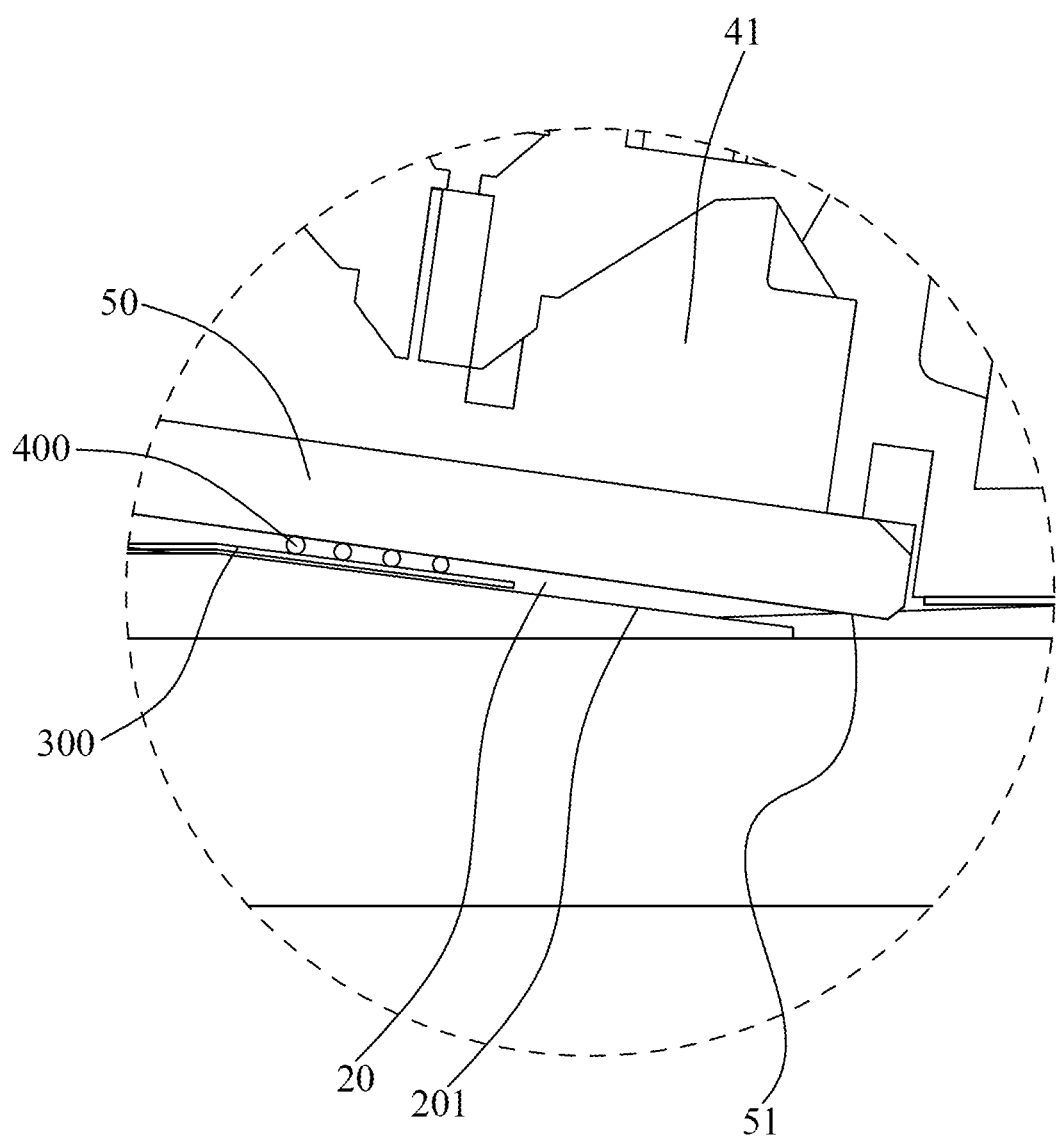
FIG. 3 is an enlarged view of an encircled portion III of the scanner of FIG. 2, wherein a document is fed into a scanning channel of the scanning module of the scanner.
Figure 4:
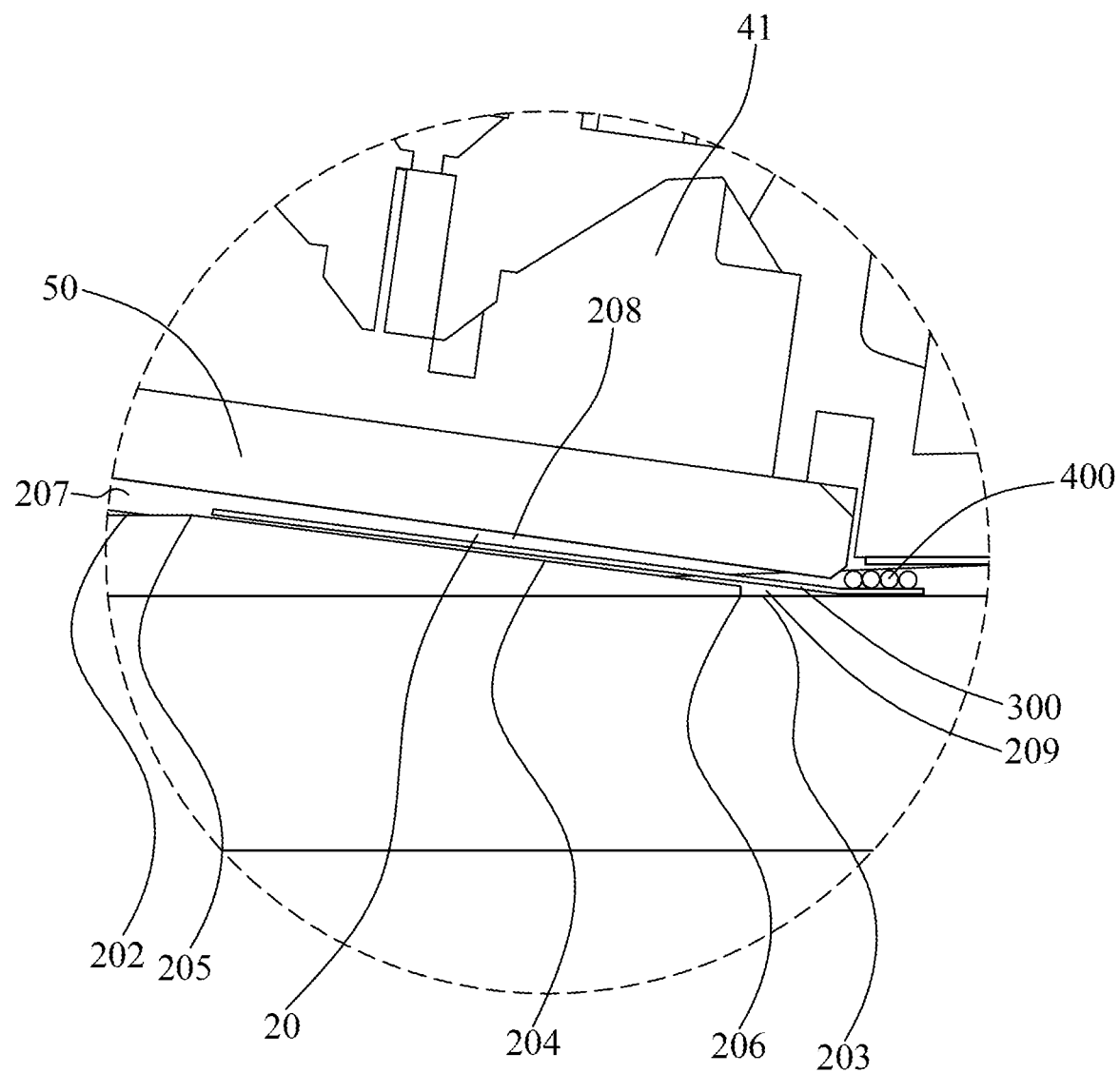
FIG. 4 is an enlarged view of an encircled portion IV of the scanner of FIG. 2, wherein the document is fed into the scanning channel of the scanning module of the scanner.
Figure 5:
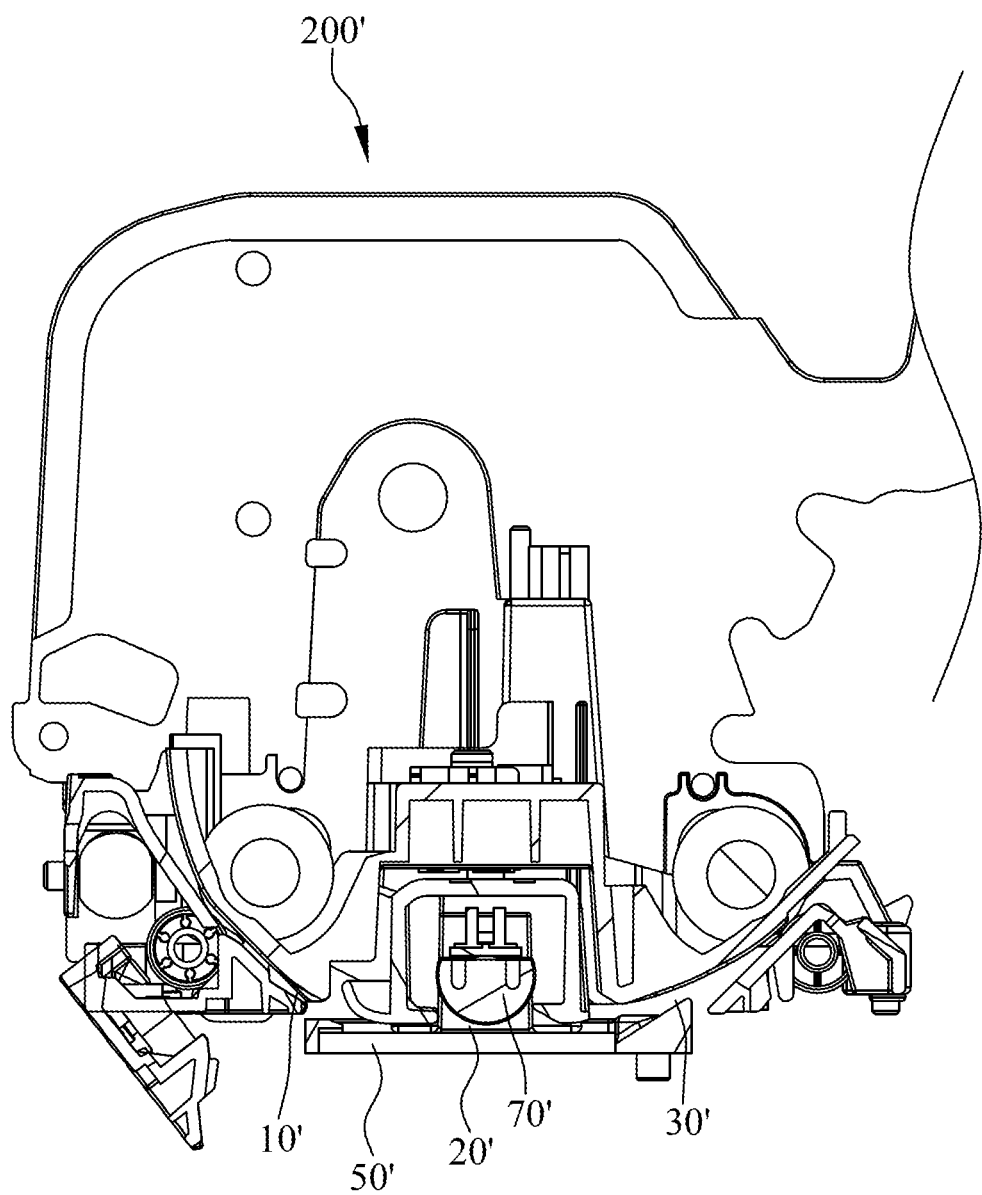
FIG. 5 is a sectional view of a conventional scanning module.

Referring to FIG. 1 to FIG. 4 again, when the scanning module 100 is used, the document 300 passes through the scan channel 20, dust 400 will be stacked in the scan channel 20 or the dust 400 will be shattered into tiny pieces, and the dust 400 is attracted to the scanning glass 50 under an electrostatic force generated by a friction between the scanning glass 50 and the document 300. Because the scanning glass 50 is in an inclined position, and an inclined bottom surface 51 of the scanning glass 50 is located above and spaced from a lower surface 201 of the scanner 200, the scan channel 20 is formed between the inclined bottom surface 51 of the scanning glass 50 and the lower surface 201 of the scanner 200, and the scan channel 20 is also an oblique channel slantwise extending downward and towards the downstream direction. The scan channel 20 and the scanning glass 50 are disposed in an inclined position.

The scanning glass 50 is disposed to a top of the scan channel 20. The scanning glass 50 is defined as a part of a top wall of the scan channel 20. The lower surface 201 of the scanner 200 is defined as a part of a bottom wall of the scan channel 20. The lower surface 201 of the scanner 200 has a horizontal upstream section 202, an inclined middle section 204 and a horizontal downstream section 203 which are seen from the lateral side of the scanning module 100. The lower surface 201 of the scanner 200 has an upstream turn 205 connected between the horizontal upstream section 202 and the inclined middle section 204 of the lower surface 201 of the scanner 200. The lower surface 201 of the scanner 200 has a downstream turn 206 connected between the horizontal downstream section 203 and the inclined middle section 204 of the lower surface 201 of the scanner 200. A first gap 207 formed between the horizontal upstream section 202 of the lower surface 201 of the scanner 200 and the bottom surface 51 of the scanning glass 50 is larger than a second gap 208 formed between the inclined middle section 204 of the lower surface 201 of the scanner 200 and the bottom surface 51 of the scanning glass 50.

When the document 300 is moved from the feed-in channel 10 into the scan channel 20, because the scan channel 20 is the oblique channel slantwise extending downward along the downstream direction, a front end of the document 300 will contact with the scanning glass 50 which is the part of the top wall of the scan channel 20 in advance to rub against the scanning glass 50. A moving path of the document 300 is limited by the inclined bottom surface 51 of the scanning glass 50, the document 300 is able to be tightly attached to the scanning glass 50 to be fed towards the feed-out channel 30. The moving path of the document has a first horizontal section, a slanted section and a second horizontal section respectively above the horizontal upstream section 202, the inclined middle section 204 and the horizontal downstream section 203 of the lower surface 201 of the scanner 200. When the document 300 passes through the scan channel 20 along the scanning glass 50, the document 300 contacts with and is tightly attached to the inclined bottom surface 51 of the scanning glass 50 to be fed towards the feed-out channel 30, the dust 400 is existed between the scanning glass 50 and the document 300.

The document 300 is transmitted from the feed-in channel 10 into the scan channel 20, and then the document 300 rubs against the bottom surface 51 of the scanning glass 50 to generate a friction force between the document 300 and the scanning glass 50, and the friction force generated between the document 300 and the scanning glass 50 is exerted on the dust 400, the dust 400 is wiped from the scanning glass 50 by the document 300 and along with a movement of the document 300 being fed into the feed-out channel 30 through the scan channel 20. Because the document 300 rubs against the inclined bottom surface 51 of the scanning glass 50 to generate the friction force between the document 300 and the scanning glass 50, and the friction force generated between the document 300 and the scanning glass 50 is exerted on the dust 400, the dust 400 is wiped from the scanning glass 50 by the document 300 and along with the movement of the document 300 being fed into the feed-out channel 30 through the scan channel 20, so the dust 400 in the scan channel 20 of the scanning module 100 is cleaned from the scan channel 20 to maintain scanning quality of the scanning module 100 scanning the document 300.

As described above, when the document 300 passes through the scan channel 20, the document 300 contacts with and is tightly attached to the inclined bottom surface 51 of the scanning glass 50, the dust 400 is simultaneously wiped from the scanning glass 50 by the document 300 and by virtue of the scan channel 20 and the scanning glass 50 being disposed in an inclined position, in this way, superfluous wiping modules are saved, and the dust 400 is prevented from being stacked in the scan channel 20. As a result, the scanner 200 saves a volume of the scanning module 100, and the scanning module 100 is able to clean the scanning module 100 automatically and maintain scanning quality at the time of the document 300 being scanned by the scanning module 100.

What is claimed is:

1. A scanning module mounted in a scanner, comprising:
a feed-in channel;
a scan channel arranged at a downstream end of the feed-in channel and connected with the feed-in channel;
a fixing frame disposed above the scan channel, a bottom of the fixing frame having an accommodating space, a mouth of the accommodating space being disposed obliquely towards the feed-in channel, the scan channel being an oblique channel slantwise extending downward and towards a downstream direction; and
a scanning glass mounted in the mouth of the accommodating space and covering the accommodating space, the scanning glass being disposed to a top of the scan channel, the scan channel and the scanning glass being disposed in an inclined position;
wherein an inclined bottom surface of the scanning glass is located above and spaced from a lower surface of the scanner, the lower surface has a horizontal upstream section, an inclined middle section and a horizontal downstream section with an upstream turn connected between the horizontal upstream section and the inclined middle section and a downstream turn connected between the inclined middle section and the horizontal downstream section, and the scan channel is formed between the inclined bottom surface of the scanning glass and the lower surface of the scanner with a moving path having a first horizontal section, a slanted section and a second horizontal section respectively above the horizontal upstream section, the inclined middle section and the horizontal downstream section.

2. The scanning module as claimed in claim 1, wherein the accommodating space is equipped with a plurality of light emitters and a plurality of photoelectricity sensors.

3. The scanning module as claimed in claim 1, further comprising a feed-out channel arranged at a downstream direction of the scan channel and connected with the scan channel.

* * * * *